J. BEBBINGTON.
APPARATUS FOR FILTERING, WASHING, AND DRYING.
APPLICATION FILED FEB. 28, 1908.

949,724.

Patented Feb. 15, 1910.
2 SHEETS—SHEET 1.

Witnesses

Inventor:
John Bebbington
by Dodge and Sons,
Associate Attys.

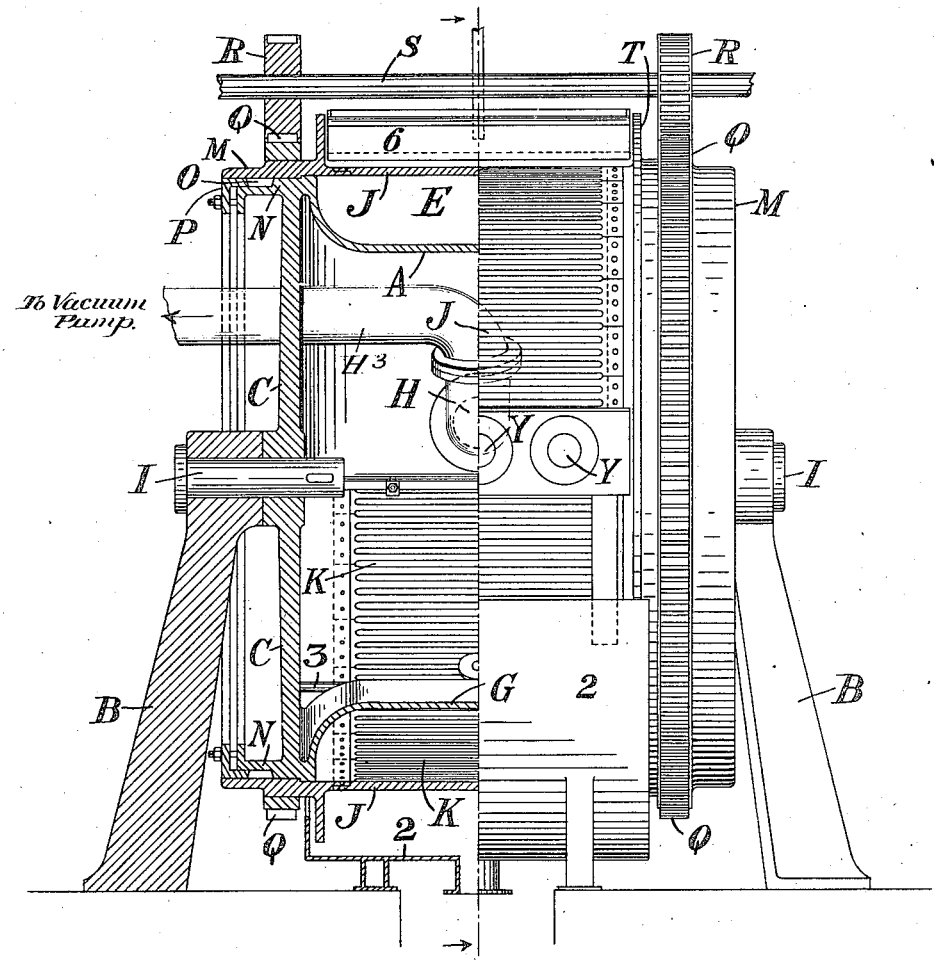

UNITED STATES PATENT OFFICE.

JOHN BEBBINGTON, OF RUNCORN, ENGLAND, ASSIGNOR OF ONE-HALF TO THOMAS TRAIN MATHIESON, OF TATTENHALL, NEAR CHESTER, ENGLAND.

APPARATUS FOR FILTERING, WASHING, AND DRYING.

949,724.　　　　　　Specification of Letters Patent.　　Patented Feb. 15, 1910.

Application filed February 28, 1908. Serial No. 418,295.

*To all whom it may concern:*

Be it known that I, JOHN BEBBINGTON, subject of the King of Great Britain, residing at Runcorn, in the county of Chester, in the Kingdom of England, contractor, have invented certain new and useful Improvements in or Relating to Apparatus for Filtering, Washing, and Drying, for which application has been made in Great Britain, No. 23,221, dated the 21st day of October, 1907.

This invention relates to apparatus for filtering, washing and drying chemical and other products.

The apparatus forming the subject of the present invention has been designed especially for the treatment of bicarbonate of soda resulting from the ammonia soda process, but is applicable to other substances also, and embodies certain improvements which will now be described.

Figure 1:
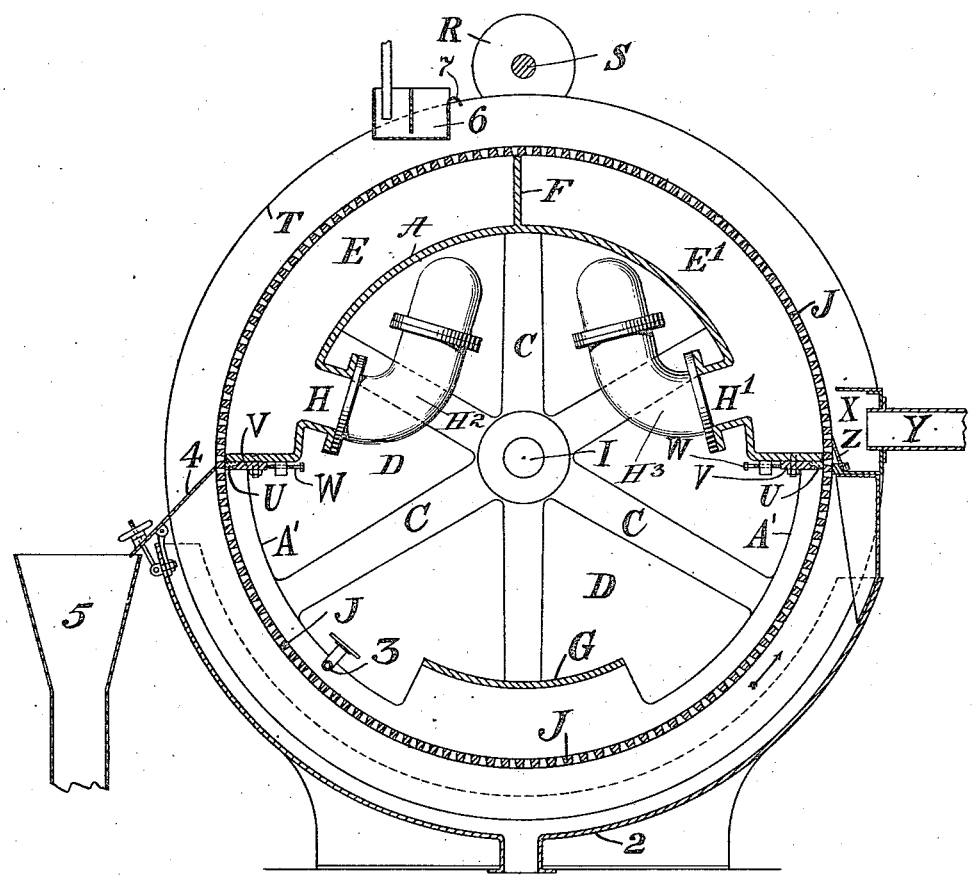
Figure 2:
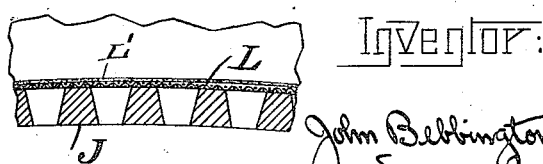

In the accompanying drawings, Figure 1 is a cross section of my apparatus for filtering, washing and drying chemical and other products; Fig. 2, a detail sectional view on an enlarged scale of a portion of the filtering drum; Fig. 3, the apparatus partly in longitudinal section and partly in side elevation.

Hitherto the obstructing particles have been removed from the filtering surfaces by disconnecting periodically the suction inside the filtering drum, and liquid has been caused to flow back in the opposite direction so as to remove the obstructing particles, and thus the apparatus had to be thrown out of use while the filtering surface was being cleaned. Or the filtering drum has been divided into compartments having openings arranged in a circle so as to rotate in front of a hollow slide face which serves to remove or cut off each compartment in succession from the influence of the suction, and cause a water current to flow from the interior toward the exterior of the filtering drum. Now by the present invention, I dispense with these arrangements, and make the drum annular, so that when necessary a man can stand inside to examine the working parts, while the machine is in motion, and I provide at one place stationary vacuum chambers inside the rotating drum, and at another place inside the rotating drum spray pipes, so that as the drum rotates every part of its filtering surface is brought successively under the influence of the vacuum chambers and under the influence of the spray jets.

The apparatus in a broad sense may be said to comprise an interior supporting frame in which suction boxes are formed, which frame likewise carries a platform upon which the attendant may stand. Surrounding and moving over said fixed frame is a cylindrical screen onto the outer surface of which the material is fed, and from which liquid is drawn inwardly into the suction boxes. Means is likewise provided for forcing into the interior of the screen, after it has passed the suction boxes, a suitable cleansing agent which, by reason of the fact that it is applied to the interior of the screen, will carry the particles off from the filtering surface into a suitable trough or the like.

The fixed interior frame is provided with a semi-cylindrical wall or trough-shaped member A, provided with an upwardly-extending partition F which divides it into two suction boxes E, E', which boxes are provided with suitable outlets H, H', to which pipes $H^2$ and $H^3$ are connected, said pipes leading to a suitable vacuum pump or other exhausting apparatus. Said suction-boxes are formed integrally with or supported by ring-shaped members A', to which spokes C are connected, forming a wheel-like structure which is supported in position by stub shafts or pins I, which pass through the upper portion of standards or brackets B.

A platform G extends across from one ring-shaped member to the opposite ring-shaped member, and upon this the attendant may stand for the purpose of inspecting the apparatus from time to time, or shutting off any valves which may be employed and adjusting the other parts of the apparatus hereinafter to be referred to.

The ring-shaped members A' are formed at their periphery with outwardly-extending flanges or bearing faces N upon which rest the flanges M of the filtering drum, suitable packing being placed in the spaces O between said parts and held in position by packing glands P.

Mounted upon the flanges M are ring-shaped racks Q, with which mesh pinions R mounted upon a shaft S driven from any suitable source.

The filtering drum J is perforated or formed with grids which are covered with wire cloth L or the like, and an annular layer of flannel or other suitable material L', Fig. 2, which forms the filtering medium.

The lower end of each of the suction-boxes E E' carries a packing member U, of rubber or the like, which bears against the inner face of the filtering drum J, said rubber members being mounted upon plates V, against which screws W bear, so that the plates may be forced out radially and caused to press the packing against the inner face of the drum.

As the inner frame or casting of the apparatus is stationary, these packing members may be examined and adjusted while the machine is in operation, by the attendant who at such time will stand upon the platform G.

A box X, with supply pipes Y through which the bicarbonate or other product to be filtered is introduced, is mounted upon suitable supports adjacent to the lower end of the suction-box E'. A tight joint is effected between the box and the drum by a rubber flap Z, which extends upwardly from the base of the box against the drum, rubber rings being also provided at the ends.

As shown in Fig. 1, there may be located at the upper or forward end of the suction-box or chamber E a tank 6, into which water is introduced, and from which it flows over a downwardly-turned lip 7, onto the material resting upon the filter surface.

A scraper 4 is located in line with the lower portion of the suction-box E and bears against the filtering medium, removing the material therefrom and discharging it into a hopper 5.

A spray-pipe 3 is located interiorly of the filter drum, and discharges water against the inner surface thereof, the liquid passing therethrough and thereby forcing any particles upon the outer surface of the filtering medium off of the same and into a trough or receptacle 2, located beneath the lower portion of the annular drum.

The mode of operation is as follows: The drum J being set in motion and a partial vacuum or suction being produced in the suction-boxes E, E', the substance to be filtered is fed against the drum J through the feed box X and collects on the filtering medium. The liquor is drawn from the substance through the filtering medium into the first suction-box E' and thence discharged through the pipe H'. As the drum rotates, the filtered substance continuously comes under the influence of the suction in the second suction-box E, being subjected, if deemed advisable, to the water passing from the tank 6. By the time the drum reaches the lower end of the second suction-box, E, the material will be relatively dry and it is then removed from the filtering surface by the scraper 4 and discharged into the hopper 5. Passing onward, the filtering surface is then subjected to the action of a spray passing through the pipe 3, which detaches particles of any obstructing material from the filtering surface. Thus the filtering process, the removal of mother liquor, the washing and drying of the filtered product, its removal into a hopper, and the washing of the filtering surface, go on continuously without interruption, and at the same time an attendant can, while standing on the platform G, watch the apparatus and adjust the working parts, such as the packings U, the valves connected with the suction pipes, and the like.

The filtering, washing and drying take place at one part of the drum, where the suction-boxes E, E' are located, and the cleaning of the filtering surface at the lower portion of the run of the drum, and each portion of the filtering medium is thus periodically washed as it passes the pipe 3.

I declare that what I claim is:—

1. In a filtering apparatus, the combination of a filtering drum; a suction-box located interiorly of the drum; means for rotating the drum; and means for subjecting the drum from the interior thereof to the action of a liquid cleansing agent, at a point beyond the suction box.

2. In a filtering apparatus, the combination of a revolving annular filtering drum; a suction-box making close contact with the inner face of said drum; means for feeding the material to be filtered against the outer face of said drum adjacent to one end of the box; means for rotating the drum; and a spray pipe located interiorly of the drum at a point remote from the box, whereby the filtering surface may be subjected to a spray to cleanse the same.

3. In a filtering apparatus, the combination of a revolving annular filtering drum; means for revolving the same; a suction-box located interiorly of the drum; means for feeding the material to be filtered to the outside of the drum adjacent to one end of the box; means for effecting a tight joint between the box and the drum; and means for subjecting the inner face of the filtering surface after it has passed the box, to a spray of liquid.

4. In a filtering apparatus, the combination of an annular filtering drum; means for rotating the same; a suction-box located interiorly of the drum and making a close fit with the inner surface thereof; means for feeding the material to be filtered to the outside of said drum and adjacent to the zone of action of the box, means for removing the filtered material from the drum; and means for cleansing the filtering surface after the filtered material has been removed from said surface.

5. In a filtering apparatus, the combination of a rotatable filtering drum; means for rotating the same; a pair of suction-boxes located within the interior of the drum and making a close fit therewith; means for introducing the material to be filtered to the drum adjacent to the lower end of one box; means for washing the material resting upon the filtering surface after it has passed the first box and is coming under the influence of the second box; means for removing the material from the drum after the material is carried beyond the second box, and means for cleaning the filtering surface after the material is removed.

6. In a filtering apparatus, the combination of a rotatable filtering drum; means for rotating the same; a pair of suction-boxes located within the interior of said drum making close contact therewith; means for feeding the material to be filtered to the exterior face of said drum adjacent to one of the boxes; means for washing the filtrate after it has passed the first box; means for removing the filtrate from the drum after it has passed the second box; and means located interiorly of the drum for subjecting the drum and the filtering medium carried thereby to a cleansing spray.

7. In a filtering apparatus, the combination of a rotatable filtering drum; a pair of filtering boxes located within and bearing against the upper portion of said filtering drum; means for effecting a tight joint between said boxes and the drum; means for introducing the material to be filtered to the outer face of the drum adjacent to the lower end of one of said boxes; means located adjacent to the opposite end of the second box for removing the filtrate from the filtering medium; and means located at a point beyond the boxes for cleansing the filtering medium.

8. In a filtering apparatus, the combination of an open supporting frame provided at its upper portion with a semicylindrical, trough-shaped member having an upwardly-extending partition dividing the same into two boxes or troughs; means for producing suction in said members; a platform located in the lower portion of said frame beneath the suction boxes; an annular filtering drum mounted upon said frame; means for effecting a tight joint between said drum and the frame; means for rotating the drum; and means located interiorly of the drum for subjecting the same and the filtering medium carried thereby to the action of a cleansing spray.

9. In a filtering apparatus, the combination of a fixed main frame having at its upper end a semicylindrical, trough-shaped member; a partition extending upwardly therefrom, dividing said member into two suction-boxes; means for effecting the withdrawal of air from said boxes; a filtering drum mounted and rotatable upon said member; means for rotating said drum; means for effecting a tight joint between each end of the drum and the corresponding end of the supporting frame; outwardly-extending flanges carried by the drum; a feed box located between said flanges and serving to feed the material to be filtered to the outer face of the drum adjacent to the lower end of one of said suction-boxes; means for washing the filtrate as it passes over one suction-box to the other; means for removing the filtrate; and means for subjecting the filtering surface to a cleansing spray.

In witness whereof, I have hereunto signed my name this 10th day of February 1908, in the presence of two subscribing witnesses.

JOHN BEBBINGTON.

Witnesses:
G. C. DYMOND,
T. S. SHILLINGTON.